(12) United States Patent
Kasmir

(10) Patent No.: US 11,743,392 B2
(45) Date of Patent: Aug. 29, 2023

(54) SMART ELECTRONIC CHIME AND MECHANICAL CHIME DEHUM BOARD

(71) Applicant: Alarm.com Incorporated, Tysons, VA (US)

(72) Inventor: Seton Paul Kasmir, San Diego, CA (US)

(73) Assignee: Alarm.com Incorporated, Tysons, VA (US)

( * ) Notice: Subject to any disclaimer, the term of this patent is extended or adjusted under 35 U.S.C. 154(b) by 211 days.

(21) Appl. No.: 17/209,112

(22) Filed: Mar. 22, 2021

(65) Prior Publication Data

US 2022/0021767 A1    Jan. 20, 2022

Related U.S. Application Data

(60) Provisional application No. 63/053,261, filed on Jul. 17, 2020.

(51) Int. Cl.
*H04M 11/02* (2006.01)
*G08B 3/10* (2006.01)

(52) U.S. Cl.
CPC ............. *H04M 11/025* (2013.01); *G08B 3/10* (2013.01)

(58) Field of Classification Search
CPC ....................................................... G08B 3/10
See application file for complete search history.

(56) References Cited

U.S. PATENT DOCUMENTS

| 9,648,289 B1* | 5/2017 | Peng ...................... H04N 7/186 |
| 10,567,711 B1* | 2/2020 | Skeoch ................. H02M 1/008 |
| 2018/0278734 A1* | 9/2018 | Scalisi ................. H04M 11/025 |

OTHER PUBLICATIONS

PCT International Search Report and Written Opinion in International Appln. No. PCT/US2021/041997, dated Oct. 20, 2021, 10 pages.
International Preliminary Report on Patentability in International Appln. No. PCT/US2021/041997, dated Jan. 26, 2023, 9 pages.

* cited by examiner

*Primary Examiner* — Travis R Runnings
(74) *Attorney, Agent, or Firm* — Fish & Richardson P.C.

(57) ABSTRACT

Methods, systems, and apparatus, including computer programs encoded on a computer storage medium, are disclosed for implementing a smart dehum circuit that powers a chime which outputs audio in response to detection of a trigger event by a video doorbell. The circuit includes a detector circuit configured to generate a power signal in response to determining that an output voltage signal of a first circuit exceeds a threshold voltage. The circuit also includes a microcontroller coupled to the detector circuit. The microcontroller is configured to generate a chime power signal based on the power signal of the detector circuit. The chime power signal is generated to power the chime in response to detection of the trigger event by the video doorbell.

18 Claims, 8 Drawing Sheets

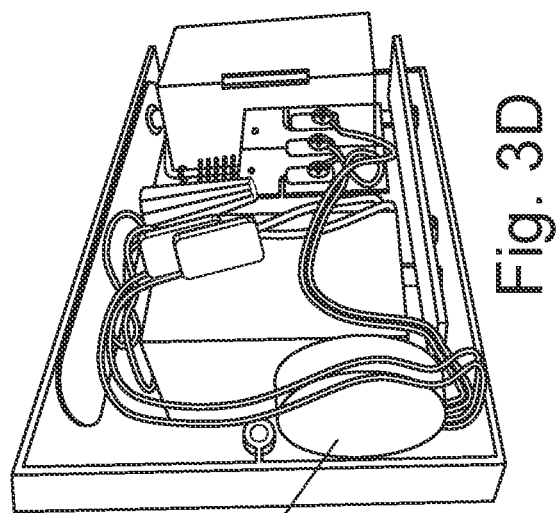
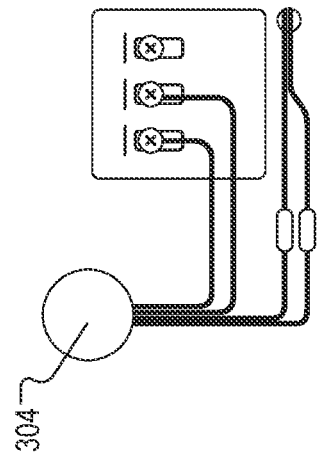
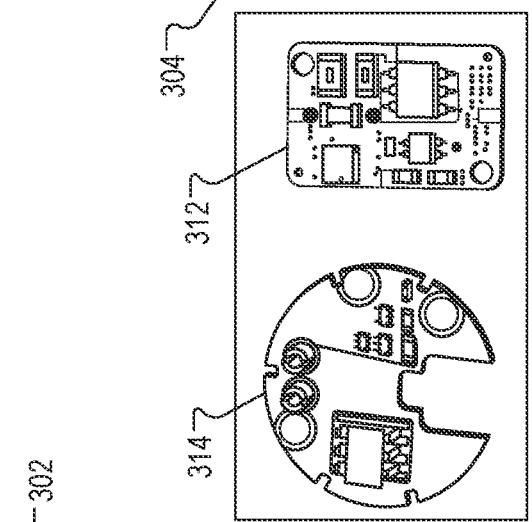
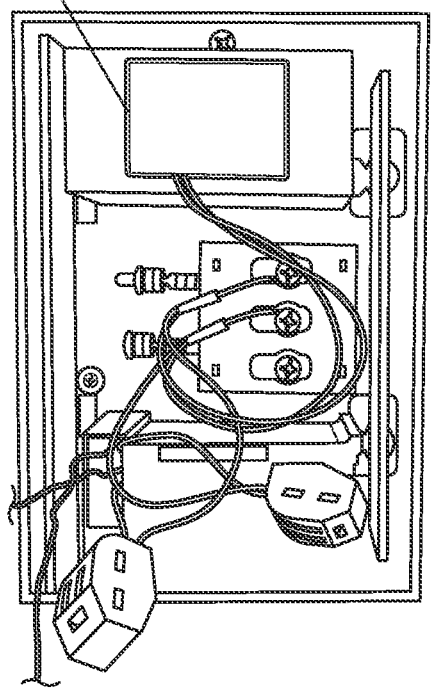
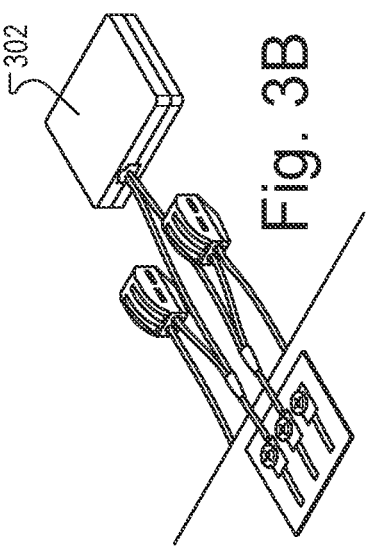

SMART ELECTRONIC CHIME AND MECHANICAL CHIME DEHUM BOARD

CROSS REFERENCE TO RELATED APPLICATION

This application claims the benefit of U.S. Provisional Application No. 63/053,261, filed on Jul. 17, 2020, which is incorporated herein by reference in its entirety.

FIELD

This specification relates to circuitry used in doorbells for a property or residence.

BACKGROUND

Doorbells and related monitoring devices are often used at various types of properties, such as a home or commercial business. These doorbells and related devices can be implemented in different ways when installed at a particular location of the property. Some doorbells include hardware circuitry that provide different types of monitoring and control functionality. The functionality afforded by these doorbells, and their respective hardware circuitry, can include wireless and audio signal transmissions, which can be leveraged to monitor persons or items at a property as well as to obtain visual information about the items and communicate with persons at property.

The video doorbell may be a newer type of Wi-Fi video doorbell that replaces the conventional doorbell buttons typically found on homes or properties. Consumers and service providers typically reuse the existing doorbell components and wiring to save installation time and cost. Installation uses the existing wiring, alternating-current (AC) transformer, and an indoor chime. The existing wiring and transformer may not offer adequate energy profiles to meet unique power requirements of newer video/Wi-Fi doorbells. Also, indoor chimes often generate unwanted noise based on the power signals output by the transformer as well as the power demands of the Wi-Fi video doorbell.

SUMMARY

This document describes techniques for an improved video doorbell that includes a special-purpose circuit that efficiently powers different types of chimes at a property. The circuit includes a controller (e.g., a microcontroller) and related hardware circuitry that are configured to power, for example, mechanical or electronic indoor chimes, while also minimizing (or eliminating) unwanted humming/noise that can occur when a video doorbell is installed at a property.

A circuit for the video doorbell is implemented as a chime dehumming board that is configured to mimic a power sequence at the property that occurs when pressing the switch of a front doorbell. The switch may be a typical switch that is often coupled to an electronic chime. The circuit is configured to mimic a typical chime powering sequence in order to fully play a tune of any length less than the ring pulse length once (e.g., only once). The circuit includes control logic that can mimic the power sequence without the typical requirement of manually tuning a ring pulse length at a particular installation or property.

For example, the control logic may be integrated in a microcontroller that is powered on based on the ring signal pulse. Based on the control logic, the microcontroller can determine a duration of a ring power signal and detect whether a chime at the property is a mechanical or an electronic chime based on the determined duration. Based on this detection, the microcontroller can generate the requisite power signals to ensure proper operation of a mechanical chime or an electronic chime. For high power doorbell applications, the circuit is configured to filter out short, high-current surges to reduce (or eliminate) occurrences of false rings due to the high current surges.

Other implementations of this and other aspects include corresponding systems, apparatus, and computer programs, configured to perform the actions of the methods, encoded on computer storage devices. A computing system of one or more computers or hardware circuits can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

FIGS. 3A-3E illustrate example bypass circuits for a video doorbell.

Like reference numbers and designations in the various drawings indicate like elements.

DETAILED DESCRIPTION

A Wi-Fi video doorbell is a relatively new product category. The video doorbell replaces the doorbell button found on homes. Consumers and service providers want to reuse the existing doorbell components and wiring to save installation time and cost. Installation uses the existing wiring, AC transformer, and an indoor chime. Often an installer or home owner doesn't know the whereabouts and cannot locate the existing doorbell's AC transformer. In an ideal case, the installation should just consist of replacing the mechanical doorbell button with a video doorbell. However, this typically is not the case.

In some implementations, video doorbells are specifically designed to use or reuse an AC step down transformer. These transformers may be properly wired to power, the chime and the front door. Often time, an installer or home owner does not know the whereabouts and cannot locate the transformer in the home. In some instances, the existing external transformer dictates the structure used in the internal power supplies of video doorbells. This power structure creates large narrow peak currents that cause the existing mechanical chime to emit a hum requiring home owners and installers to have to install, inside the home and on the existing chime, a bypass circuit. This adds time and cost to the installation and causes an installer to work inside the home in order to install a bypass circuit, which is in addition to putting a video doorbell on the outside of the home.

In addition, a new type of AC power supply that replaces the existing doorbell transformer, with AC output is not the traditional sinusoidal waveform, can power both existing generation video doorbells and the newer, more featured, and higher powered video doorbells without the chime humming sound.

Figure 1:
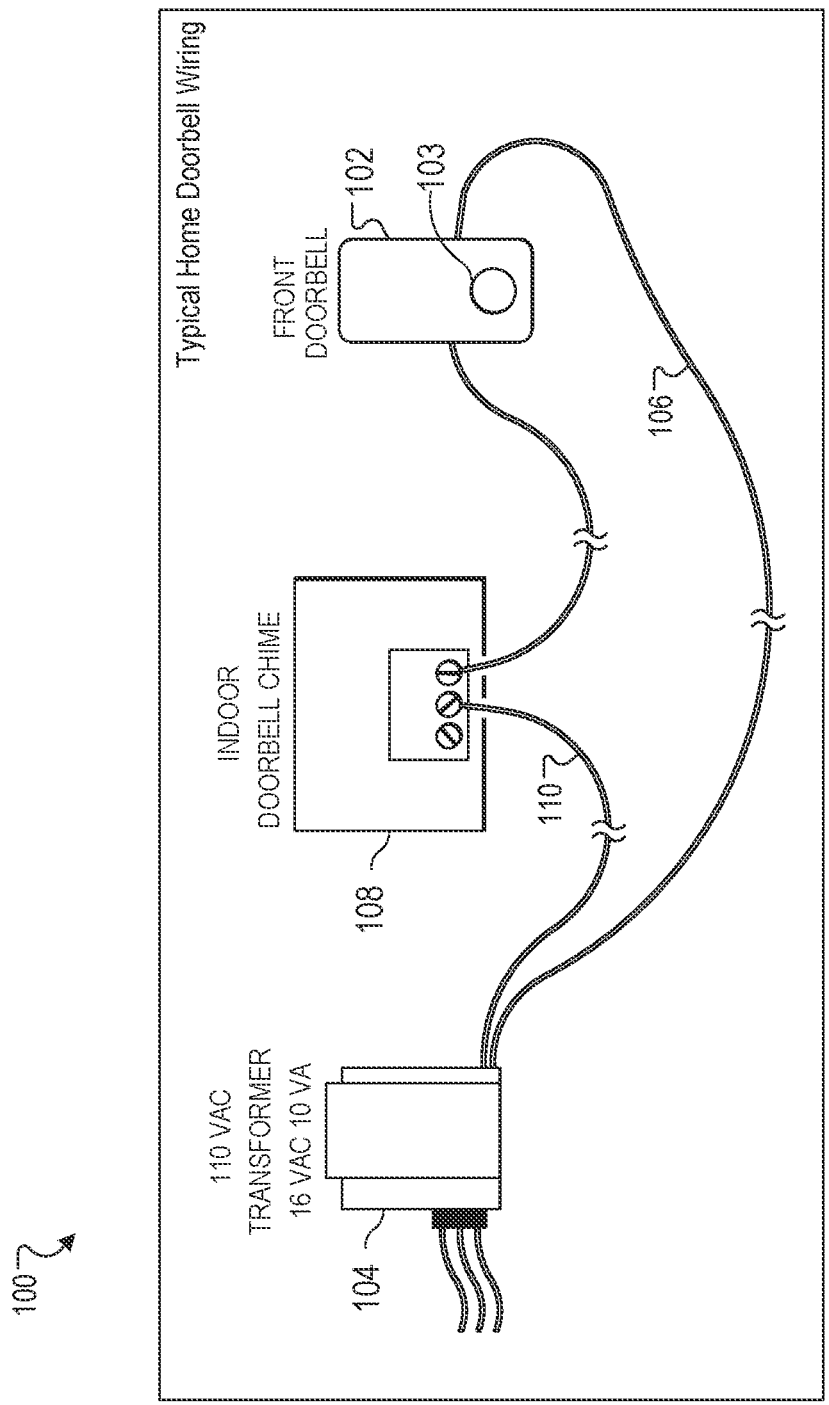
FIG. 1 illustrates an example home doorbell wiring diagram.

FIG. 1 illustrates an example home doorbell wiring diagram. As shown, the front doorbell button which is a mechanical switch mounted on the outside of the house (or other structure) is connected to both a transformer by one wire and a chime (mechanical or electronic). The front doorbell button is open until a person presses it. Pressing completes the circuit so that the transformer power is applied to the indoor chime which causes the familiar doorbell sound such as "ding dong".

Figure 2:
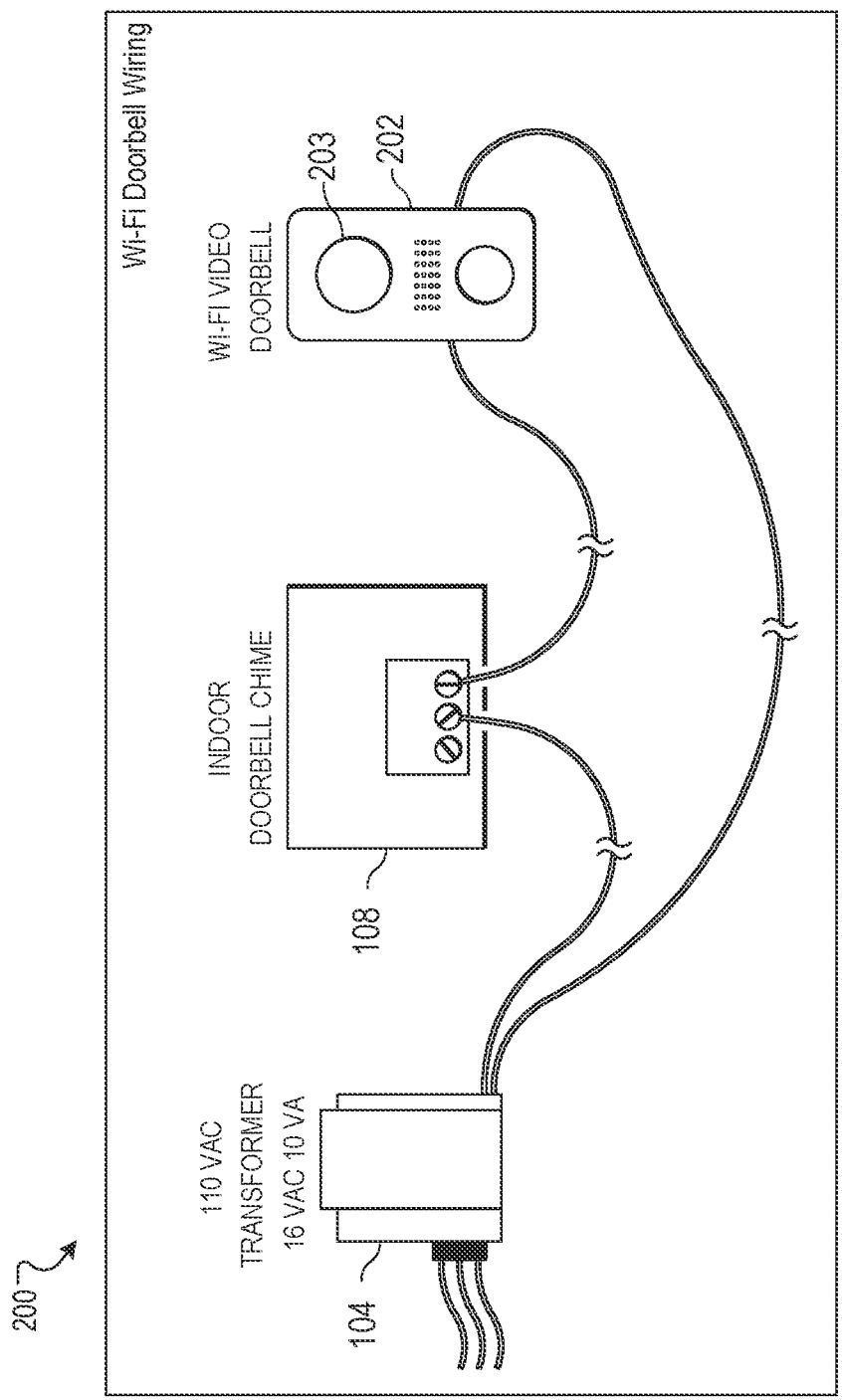
FIG. 2 illustrates an example home doorbell wiring diagram where the video doorbell replaces the mechanical switch mounted on the house and is able to draw power from the transformer via two wired output connections.

FIG. 2 illustrates an example home doorbell wiring diagram 200 where a video doorbell 202 (e.g., a Wi-Fi video doorbell) replaces the mechanical switch/button 103 of the front doorbell mounted on the property and is able to draw power from the transformer 104 via two wired output connections. In the example of FIG. 2, transformer output connection travels through the wiring resistance inside the chime of a mechanical chime 208, and the other output is connected by a wire 106 directly to the transformer. The resistance of the mechanical chime may be, for example, six to eleven ohms.

The video doorbell 202 mimics the mechanical switch when its button is pressed by shorting the two external wires together, which applies all the power to the mechanical chime 108 making the ding dong sound. When the doorbell 202 is not ringing, the circuit is not open like the previous mechanical front doorbell, but instead, uses some amount of power that is lower than the amount of power to ring the indoor chime. The two states for voltage across the doorbell is normal operation where 90+ percent of the voltage of the transformer is across the doorbell. In some implementations, out of 20.5 volts AC RMS from the transformer, it will be about 20 volts AC RMS. The other state is where electronically, the doorbell shorts its two input wires to simulate a button press. There may be little voltage across the doorbell. The normal operation includes powering on and booting up, going offline, configuring it via the application on the mobile phone, and active or inactive but alive. The impedance of the chime or chime bypass may be less than the video doorbell so under any state other than ringing, most of the voltage is across it.

If an electronic chime is used instead of a mechanical chime, the electronic chime doesn't allow enough current to flow through it to allow a video doorbell to work in series with it and the transformer. Instead, it looks like a very high resistance so the all the voltage will be applied to the electronic chime and with no voltage and not enough current there is not enough power left to operate the video doorbell. For the video doorbell to work, something else must be done to the wired circuit.

FIG. 3 illustrates example bypass circuits for a video doorbell. Each of FIGS. 3A-3E illustrate examples of bypass circuits for a video doorbell. More specifically, each of FIG. 3A and FIG. 3B illustrate an example system that includes a device 302, which encloses an example bypass circuit 312 illustrated in FIG. 3C. Likewise, each of FIG. 3D and FIG. 3E illustrate an example system that includes a device 304, which encloses an example bypass circuit 314 illustrated in FIG. 3C. To complete the circuit when there is an electronic chime, a bypass circuit may be utilized. The bypass circuit can be used to power down the electronic chime and then wake up the chime with a signal that will ring it only when it needs to be used. In some implementations, a video doorbell utilizes the same bypass circuit for both electronic and mechanical chimes.

There are several examples of bypass circuits for the electronic chime. This bypass circuit is just what the name means, it bypasses the chime such that most of the power goes directly to the doorbell without having to travel through the electronic chime. In some implementations, the current bypass circuits for electronic or mechanical chime allow some energy to pass through the chime since they are not a complete short across it. The shorting part has some additional series resistor (impedance) and both are applied to the chime directly not just the short part. The parallel combination of the chime and the bypass combined make up the series impedance of the chime. Some doorbells may require large amounts of power that this power going through the mechanical chime is not so insignificant, and it still hums in some installations.

The circuit can be modified so that no current flows through the chime. This is important because the chime cannot hum and the power wasted on the chime makes it difficult to power the doorbell when some of the power is wasted since the total power that the doorbell requires plus the wasted power is greater than the transformer can provide hard to power that waste and this new doorbell since that total is more than the transformer can give. Some transformers are old which exacerbates this. The bypass circuit can detect when the video doorbell intends to ring it by the video doorbell shorting together its input wires and the bypass circuit detecting that the transformer voltage is now near fully applied to the chime.

During normal operation when the chime is being rung, the bypass circuit can have a solid-state relay or shorting element that is normally closed with some series impedance which shorts (bypasses) the electronic chime's two wires together. This keeps most of the power from flowing to the electronic chime. When the video doorbell wants to ring the chime, it shorts its wires together which applies the transformer voltage to the bypass circuit. In addition to the relay on the bypass, there is a voltage detector which can be diodes whose DC output suddenly rises when most all of the transformer voltage is applied to the bypass. This rise in the applied AC voltage causes the bridge diode output to create a voltage or current to flow which then opens the shorting circuit, removing the short across the chime. When the shorting circuit is open, it is no longer bypassing the chime. Upon opening the shorting circuit the transformer power is now applied to the chime causing it to produce the ringing sound, such as ding dong.

In some implementations, a video doorbell utilizes the same bypass circuit for both electronic and mechanical chimes. The reason they require a bypass for the mechanical chime is due to hum. In some cases it increases the amount of power required to power a video doorbell. While this amount of power is still significantly less than it takes to ring a mechanical chime, due to the design of their power supplies, they create large current spikes that must travel through the mechanical chime solenoid coil. These current spikes can cause a mechanical chime to emit an annoying humming sound. As video doorbells use more and more power the humming noise will be louder and the current generation of bypass circuits may be too restrictive to allow enough power to flow to these newer video doorbell, even while in bypass mode. Electronic chimes and humming mechanical chimes may not be the only installation challenges faced when installing a video doorbell to a wide range of customers.

As discussed above, in a home with a doorbell, there may be several elements that make up a system for announcing someone is at the door. The elements may include a low voltage AC transformer that converts the home power 110 VAC to 16 VAC, a chime for announcing that someone is at the door, a button next to a door such as the front door, and wiring that connects all of this together. Pressing the button may complete the circuit in a way that all the transformer power is applied to the chime. There are two types of chimes commonly found in a home; mechanical and electronic. A mechanical chime has bells inside that a plunger hits to make the infamous "ding dong" sound. An electronic chime plays a tune through a speaker that can sound like ding dong or more elaborate tunes like the eight second Westminster chime.

For a mechanical chime, when the button at the door is pressed, the circuit closes and causes the plunger in the chime to hit one of the bells or bars giving the "ding" sound. As soon as you release the button, it opens the circuit and a return spring inside the chime causes the plunger to strike the other bar or bell causing the "dong" sound. The process of the ding and the dong sound take approximately a second but can be longer or shorter.

The electronic chime may typically play a tune that is longer than a button press, often up to eight seconds. In some implementations, the electronic chime is constantly powered and must detect when the button is press and remains powered so that it may finish playing the tune after the button is pressed. There are several methods for doing this. One method uses a diode placed behind the button that constantly powers the chime. As soon as the button is pressed, the diode is shorted placing almost the entire transformer AC voltage applied to the chime. The chime detects the AC which causes it to play its tune. When the button is released before the tune has finished, DC is applied in order to finish playing the tune. The chime sees a voltage pattern of DC (idle), AC (button press) and then DC (button released).

In the circuit of a video doorbell, an electronic chime, a chime bypass, house wiring, and a transformer, the chime doesn't see the same sequence which causes several issues. The chime bypass has only two states. One state is when the bypass pulls most of the power away from the chime when not ringing, and the second state is the bypass detects the ring voltage and applies almost all the available power to the chime.

To ring a chime, a video doorbell may short its input which will then apply almost all the AC transformer voltage to the bypass and the chime. The sequence using a typical chime bypass is as follows. The chime itself goes from not enough power to operate (bypassed) to full AC power and back to not enough power to operate. The response of the chime is to play a tune while powered by the AC. If the length of time this AC power is applied is shorter than the tune itself, the chime stops playing that tune early, cutting the sound off before the tune has finished playing. If the length of time AC power is applied is longer that the length of the tune, the chime starts to replay the tune a second time in a row but gets cut off before it can finish playing the entire tune a second time. A technique to properly operate an electronic chime so that it plays any length tune is to adjust the duration of the ring pulse the doorbells applies to match the length of the tune to be played. This may be done through a mobile phone application.

The video doorbell's configuration is set to either electronic chime which will apply ring voltage to the chime bypass for approximately eight to nine seconds or it is set to a mechanical chime which is approximate two hundred fifty milliseconds.

This specification describes systems and methods for a smart electronic chime and mechanical chime dehum circuit board ("dehum board") to overcome the deficiencies of using a chime bypass. The chime dehum board may mimic the power sequence an electronic chime typically sees when a front doorbell switch is pressed. The chime dehum board may detect and properly operate a mechanical chime or an electronic chime, and may detect which type of chime is to be operated without any switch setting purely based upon a duration of a ring pulse from a doorbell.

A processor on the chime dehum board may be completely powered down when not initiating ringing of a chime, and a ring pulse from a doorbell may apply power to the processor. For high powered doorbells, the chime dehum board may filter out false rings due to short high current surges. This filter feature corresponds to a 40 millisecond (ms) time threshold that is used to filter out over-powered rings (described below).

The chime dehum board may be akin to a single pole double throw switch where one position there is no power and the other position full power. Specifically, while not being rung, the chime may see absolutely no power as it may be completely disconnected to power, instead of reduced or shared power with the bypass circuit in one state. In the other state, the chime dehum board circuit reconfigures itself and switches the power so the chime sees practically all of the transformer power.

The chime dehum board may be implemented as a small board placed in or around the chime. Alternatively, the chime dehum board may be placed next to the doorbell or another location. The chime dehum board may be electrically coupled to the doorbell and the transformer, and output voltage to the chime. The board automatically distinguishes which type of chime, electronic or mechanical it is connected to by the length of the ring pulse it detects. In the case of an electronic chime, the board eliminates the need to adjust the time of the ring pulse from the doorbell, yet the board will play most any length tune once and only once for every ring pulse. For an electronic chime, the board mimics the human doorbell press that goes DC, AC and the DC. For a mechanical chime, the board allows the short two hundred fifty millisecond ring pulse and then returns to idle state.

The chime dehum board has unique elements for a board attached to a chime. The board operates on DC after rectifying the transformer AC. It includes a control processor, various control circuits, and a DC to AC power supply. The control processor is generally powered off and is powered on when the chime is to be rung.

The chime dehum board detects a ring pulse created by the video doorbell shorting its input so that the transformer power is applied to the dehum board. If that pulse is greater than a certain duration of time, the board determines the ring pulse is not an unintended pulse, e.g., a false ring due to a short high current surge, and the chime is to be rung. The board takes the AC that comes out from the transformer when the doorbell rings/shorts and the board turns the AC into DC power. If the duration of the ring pulse does not satisfy a duration criteria, e.g., is less than one second, the chime dehum board decides the ring pulse is for a mechanical chime and the board just applies the DC power to the chime. The dehum board both counts time up to the expected duration of a mechanical and detects when the ring pulse disappears. If either occurs it resets itself to an idle state by switching the circuits so absolutely no power is applied to the chime. The control processor then powers off.

Otherwise, if the duration of the ring pulse satisfies the duration criteria, the chime dehum board determines the chime is an electronic chime. The start of the chime ringing sequence for both electronic and mechanical chimes is the same, which is to apply DC power. For the electronic chime, the DC powers up the chime just like the idle state when operated without a video doorbell. After some time the chime dehum board converts the DC output voltage into an AC output voltage applied to the chime. This is the same as pressing the front doorbell switch. The chime detects the AC signal and starts to play its tune. After a short period of time, much shorter than any typical tune, the board then only applies DC power like releasing the doorbell button.

Figure 4:
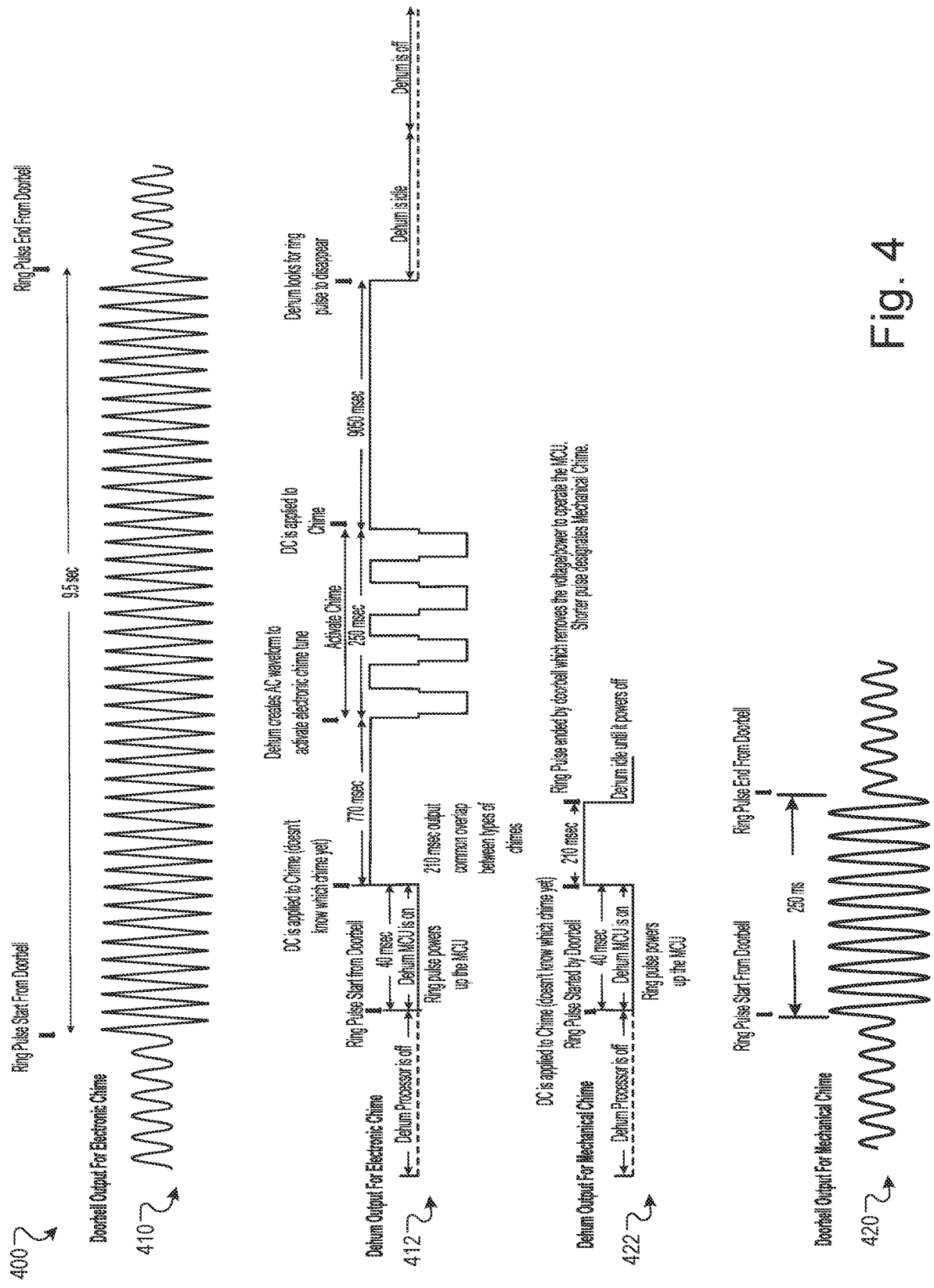
FIG. 4 illustrates a timing diagram showing voltage signals for a dehum circuit.

For the duration of the time, the chime dehum board applies DC longer than typical tunes which keeps the chime from cutting off the tune too early, and using DC instead of AC ensures the tune does not repeat. To accomplish this, the only requirement of the video doorbell is to short or ring the electronic chime for longer than the longest typical chime tune. The smart dehum boards times the ring pulse and if it is past its expected time or it detects the elimination of the ring pulse at the end and resets itself such that no power is applied to the chime and then its processor is powered down FIG. 4 illustrates a timing diagram 400 showing voltage signals for a dehum board. The diagram 400 shows voltages output from a doorbell for an electronic chime 410, voltages output from a chime dehum board for the electronic chime 412, voltages output from a doorbell for a mechanical chime 420, and voltages output from a chime dehum board for the mechanical chime 422.

As shown in output 410, for an electronic chime, the doorbell outputs a 9.5 second ring pulse. Output 412 shows that the dehum board powers on once the ring pulse starts. After forty milliseconds the dehum board then provides DC voltage to the electronic chime. After 770 milliseconds of providing the DC output, the dehum board then provides AC voltage to the electronic chime. And then, after two hundred fifty milliseconds of providing the AC voltage, the dehum board provides DC voltage again until the ring pulse ends.

As shown in output 420, for a mechanical chime, the doorbell outputs a two hundred fifty millisecond ring pulse. Output 422 shows that forty milliseconds after the ring pulse starts, the dehum board just provides DC voltage to the mechanical chime until the ring pulse ends.

In some implementations, the chime dehum board may output the DC and AC voltages for different durations. For example, the chime dehum board may output an initial DC voltage for seven hundred seventy milliseconds, then AC voltage for two hundred fifty milliseconds, and then DC voltage for eight thousand eight hundred milliseconds. In another example, the chime dehum board may output an initial DC voltage for one hundred to two hundred milliseconds, then AC voltage for five hundred milliseconds, and then DC voltage for eight thousand eight hundred milliseconds.

Figure 5:
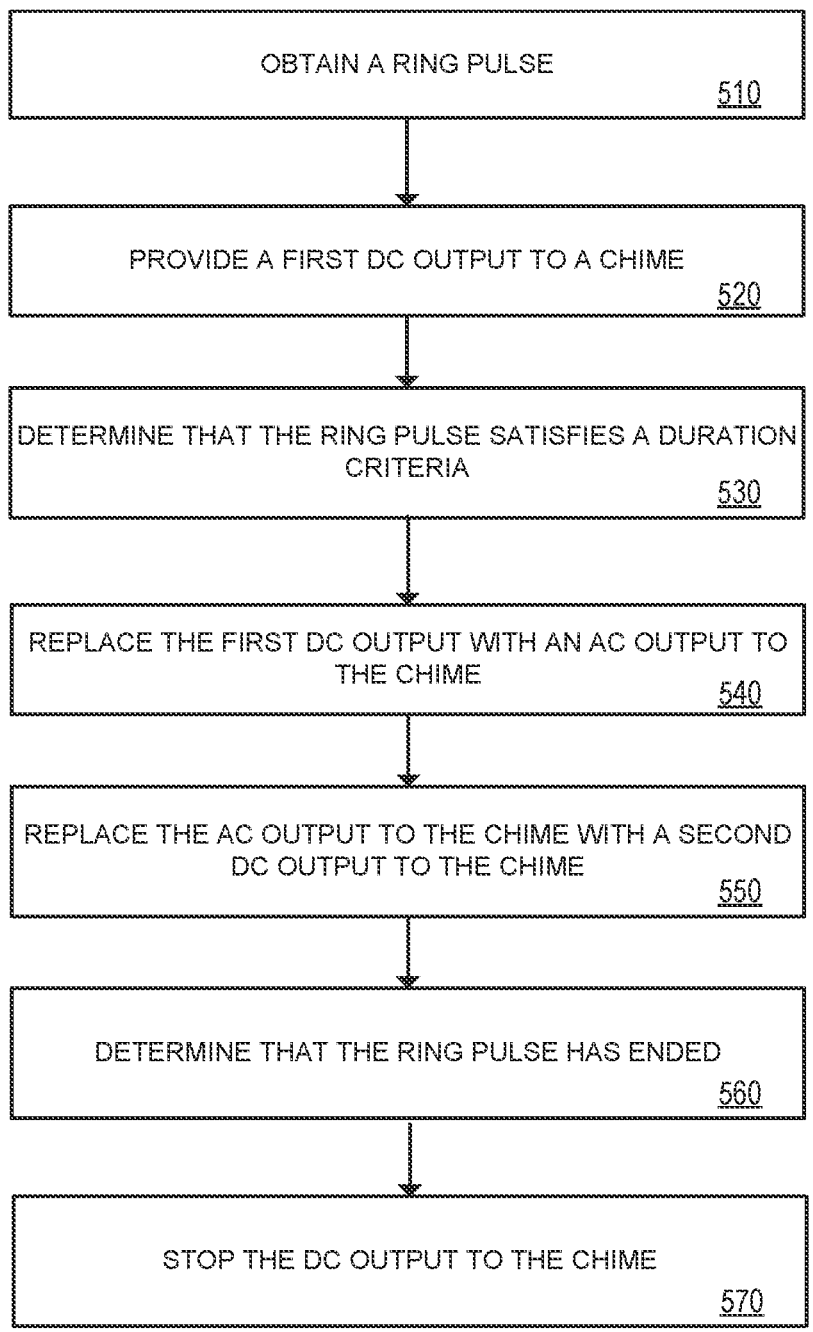
FIG. 5 illustrates a flowchart of a process for a dehum circuit to ring a chime.

FIG. 5 illustrates a flowchart of a process 500 for a dehum board to ring a chime. The process 500 includes obtaining a ring pulse 510. For example, the dehum board may be electrically coupled to the doorbell and may receive an AC voltage signal (e.g., one VAC), then receive sixteen VAC for 9.5 seconds, then receive one VAC. The sixteen VAC corresponds to a ring pulse for an electronic chime. In some implementations, a control processor of the dehum board analyzes characteristics of these voltage signals and, based on the analysis, determines that the ring pulse signal is for an electronic chime. The control processor can make this determination at least by detecting and analyzing a duration of this ring pulse signal. In another example, the dehum board may receive one VAC, then receives sixteen VAC for two hundred fifty milliseconds, and then receives one VAC. The two hundred fifty milliseconds sixteen VAC corresponds to a ring pulse for a mechanical chime. In some implementations, the control processor of the dehum board analyzes characteristics of these AC voltage signals and, based on the analysis, determines that this particular ring pulse signal is for an electronic chime. For example, the control processor can make this determination at least by detecting and analyzing a duration of this particular ring pulse signal.

The process 500 includes providing a first DC output to a chime 520. For example, the dehum board may be powered on by the ring pulse and once the ring pulse has lasted for forty milliseconds, provide ten VDC to the chime. The dehum board may output the first DC output whether or not the chime is an electronic chime or a mechanical chime because DC voltage is initially provided to both types of chimes.

In some implementations, providing a first DC output to a chime includes providing the first DC output after the ring pulse satisfies a noise criteria. For example, the processor of the dehum board may determine that the ring pulse has lasted for forty milliseconds so satisfies the noise criteria of longer than forty milliseconds and, in response, causes the dehum board to output DC to the chime. In another example, the processor may determine that the ring pulse ended after thirty milliseconds so did not satisfy the noise criteria of longer than forty milliseconds and, in response, causes the dehum board to turn off without having provided any voltage to the chime in response to the ring pulse.

The process 500 includes determining that the ring pulse satisfies a duration criteria 530. For example, the processor of the chime dehum board may determine the ring pulse has satisfied a duration criteria of longer than 810, 830, or some other amount of milliseconds. In another example, the processor of the chime dehum board may determine the ring pulse has satisfied a duration criteria of longer than or equal to 790, 810, 850 or some other amount of milliseconds. In response to determining that the ring pulse did not satisfy the duration criteria, the chime dehum board may stop outputting DC voltage when the ring pulse stops and then turn off.

The process 500 includes replacing the first DC output with an AC output to the chime. For example, in response to determining that the ring pulse satisfies the duration criteria, the processor may cause the chime dehum board to stop providing fifteen VDC and instead provide fifteen VAC after the ring pulse has been on for 810 milliseconds. DC output initially provided to the electronic chime may power on the chime, and the AC output may cause the electronic chime to start playing a tune through a speaker in the chime.

The process 500 includes replacing the AC output to the chime with a second DC output to the chime. For example, after two hundred fifty milliseconds, the dehum board may stop providing the fifteen VAC to the chime and instead provide fifteen VDC again. The AC output to the chime may be replaced after a predetermined amount of time. For example, the dehum board may replace the VAC with VDC after two hundred, two hundred fifty, three hundred, or some other amount of time that is shorter than a duration of any tune likely to be used. By stopping providing VAC to the chime, the process 500 may ensure that the electronic chime does not repeat a tune, and continuing to provide VDC after the VAC ensures that the electronic chime continues to play the tune while the VDC is provided.

The process 500 includes determining that the ring pulse has ended 560. For example, the chime dehum board may determine that an AC voltage received by the chime dehum board has decreased after 9.5 seconds of being increased from an idle state. The process 500 includes stopping the DC output to the chime. For example, in response to determining that the ring pulse has ended, the chime dehum board may stop outputting any voltage to the chime and then power off.

Figure 6:
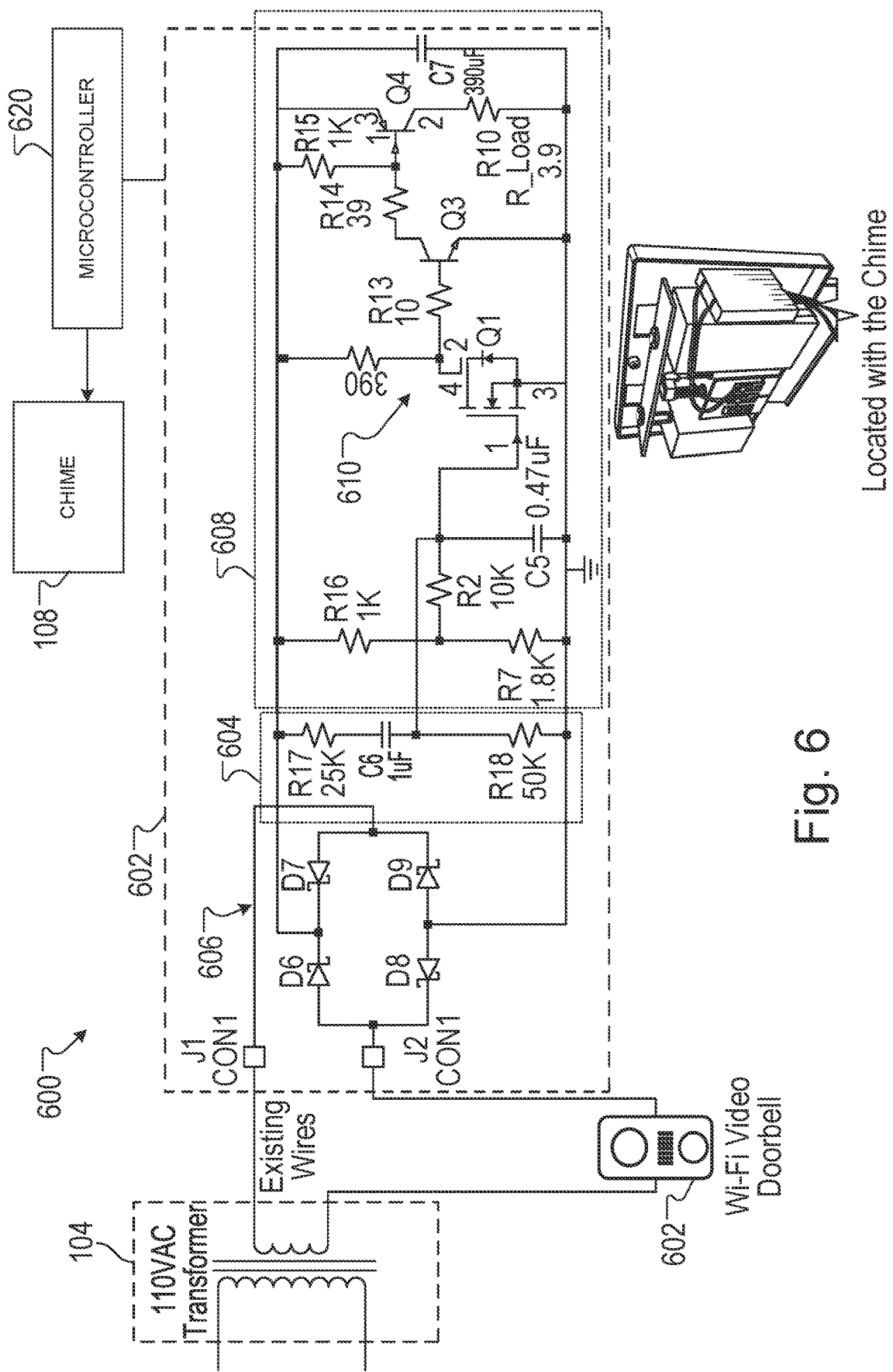
FIG. 6 illustrates an example dehum circuit.

FIG. 6 illustrates a block diagram of an example system 600 that includes a dehum circuit 602, a video doorbell 202, a transformer 104, a chime 108, and a microcontroller 620.

In some implementations, the circuit 602 may be included as part of the video doorbell 202. In some other implementations, the circuit 602 is a main dehum circuit that includes multiple circuits or circuit portions, where some (or all) of the circuits may be separate from the video doorbell 202, included as part of the video doorbell 202, or included with the chime 108. For example, the circuit 602 can include a detector circuit that includes a rectifier configured to generate an output power signal. The detector circuit is based on some (or all) of circuit components 604, 606, 608. The circuit 602 can also include a resistor value that represents the resistance of the wiring at a residence, home, or property that includes the doorbell 200.

The microcontroller 620 can be coupled to the detector circuit of circuit 602. The microcontroller 620 is configured to generate a chime power signal based on a power signal (e.g., ring signal) output by the detector circuit. The chime power signal is generated to power the chime in response to detection of a trigger event by the video doorbell. In some implementations, the microcontroller 620 includes timing logic and is configured to determine, based on the timing logic, that the power signal of the detector circuit satisfies a first time threshold.

The microcontroller 620 generates a chime power signal to power the chime 108 based on the determination that the power signal satisfies the first time threshold. In some implementations, the first time threshold is 40 milliseconds and corresponds to a time-based filter that causes the microcontroller 620 to only generate a chime power signal when the power signal of the detector lasts longer than 40 ms. Because this 40 ms time threshold coincides with the duration of high-current surges, powering the chime only after that duration passes ensures that the detected ring signal is not a false ring due to the high-current surges. The microcontroller 620 is configured to determine, based on its timing logic, that the chime is an electronic chime in response to determining that the chime power signal satisfies a second time threshold. In some implementations, the second time threshold is 210 ms, 300 ms, or between 100 ms and 400 ms.

In some cases, the circuit 602 can detect a ring signal and make determinations about the signal independent of the control logic of the microcontroller 620. For example, the circuit 602 may be designed and used as a standalone device that is operable to detect a ring signal and power a chime 108 independent of the microcontroller 620. The microcontroller 620 can monitor the signal coming from D6 and D7 (e.g., via a detector node intermediate D6 and D7) and use that signal to detect and determine that a ring (or similar trigger event) is occurring, or has occurred. In some cases, the system 600 is configured such that one or more detection functions of the circuit 602 and microcontroller 620 are synchronized because if the circuit 602 does not recognize it the voltage at D6 and D7 does not go high enough such that the microcontroller 620 detects that a ring signal was generated.

The circuit 602 has multiple functions. For example, when signaled by the doorbell to ring by the doorbell shorting its wires, circuit 602 is configured to apply all, or nearly all, of the available transformer voltage and current to the chime 108. When not ringing, circuits 602 completes the circuit with low impedance so that most of the transformer power is applied to the doorbell 202. In some implementations, circuit 602 is a dehumming circuit configured to pass the current and voltage intended to be applied to the chime through a rectifier to create a DC voltage and current. The dehumming circuit 602 creates a single pole double throw (SPDT) switch (e.g., Q1) that, when in one position, runs the power through a small resistance during typical operation.

Referring again to FIG. 6, an example operation of circuit 602 will now be described. The circuit 602 includes a Q1 that operate turns on when a ringing voltage is applied and the chime current passes through it. Instead of using a low voltage to turn on the transistor that passes current through R-Load, a set of transistors Q3 and Q4 turn on based upon a small current available from a very low voltage associated with transistor, Q1. The two transistors Q3 and Q4, unlike where Q2 did not require any current, the bipolar transistors Q3 and Q4 do require current. Two transistors amplify the current so only a small amount of current is required to activate the first transistor Q1 when it is not ringing. In some implementations, the circuit 602 includes a differentiator circuit 604 that is coupled to a voltage divider circuit 608. The circuit 602 also includes switch control circuitry 610, which is described in detail below.

The differentiator circuit 604 cooperates with the voltage divider circuit 608 to accelerate turning off the transistor switch Q1 in the absence of an applied voltage to the chime. In some implementations, the differentiator circuit 604 assists or supplements the voltage divider circuit 608 to increase the rate at which Q1 turns off when the doorbell is not ringing in the chime. In some other implementations, the differentiator ensures that Q1 turns OFF in the absence of an applied voltage to the chime. In one instance, the differentiator circuit 604 increases the response time of the dehum circuit 602 by accelerating the time it takes for Q1 turn ON, whereas in another instance the differentiator circuit 604 increases the response time of the dehum circuit 602 by accelerating the time it takes for Q1 turn OFF.

The voltage divider circuit 610 is coupled to a rectifier circuit 606 and the switch Q1. In some cases, the voltage divider circuit 610 is generally intermediate the rectifier circuit 606 and the switch Q1. The rectifier circuit is formed based on the diodes D6, D7, D8, and D9. The voltage divider 610 is configured to generate a voltage that is proportional to the signal generated by the rectifier circuit. The voltage divider circuit 610 can generate this voltage signal by adjusting a magnitude of the voltage signal generated by the rectifier circuit. In some implementations, the voltage divider circuit 610 generates an adjusted voltage signal that is proportional to the signal generated by the rectifier circuit by adjusting a magnitude of the signal output by the rectifier circuit.

The switch control circuitry 610 includes the transistor switches Q3 and Q4. The control function of the switch control circuit 610 can be based on Q3 being coupled to the transistor switch Q1. In this implementation, the transistor switch Q3 is a current amplifier that generates a control signal to cause the transistor Q4 to turn on and provide a DC voltage signal used to power the vide doorbell 220. Transistor Q1 can be configured as a SPDT switch that is used to switch between at least two signal paths of the circuit 602.

For example, the circuit 602 can includes a first signal path that corresponds to a first operating mode, where the video doorbell does not ring the chime, and transistor switch Q4 routes power signals of the power source using the first signal path to apply available power of the power source to the video doorbell. The circuit 602 also includes a second, different signal path that corresponds to a second operating mode, where the video doorbell rings the chime, and the transistor switch Q1 uses the second signal path to route power signals of the power source and apply available power of the power source to the chime.

The power is applied to ring the chime so the chime outputs or generates an audio sound during the second operating mode, such as when a person pushes a doorbell button on the video doorbell. In some implementations, the power signals are routed to the microcontroller 620 to power on the microcontroller cause the microcontroller to mimic a power sequence of an electronic or mechanical chime. In some other implementations, the available power of the power source that is applied is all of the power output by the power source.

In some implementations, circuit 602 is configured such that: a) transistor switch Q4 is a current-controlled bipolar junction transistor (BJT) that generates a base-emitter voltage from signals generated by the rectifier circuit and based on a current signal generated by transistor switch Q3; b) transistor switch Q1 is a voltage-controlled field effect transistor (FET) that generates a gate-to-source voltage proportional to a voltage signal generated by the rectifier circuit; and c) transistor switch Q3 is a current-controlled BJT that generates its current signal based on a threshold amount of current that flows along a circuit path that couples transistor switch Q3 to transistor switch Q3.

Based on transistor Q1, the circuit 602 can be configured to generate a DC voltage signal for a threshold time period to switch on the microcontroller and generate a power sequence to supply power to the chime. The circuit 602 can power the chime without generating a current that induces magnetic effects in the chime, such as magnetic effects that can disrupt operation of the chime. The threshold time period can be less than 200 milliseconds or between 200 and 500 milliseconds, or less than 9050 milliseconds. Other threshold time periods may also be used. In some implementations, the transistor switch Q1 is a field-effect transistor that includes a gate, a drain, and a source and a voltage at the gate of transistor Q1 is used to control when a current signal is routed through the chime 108 to generate the audio. This current signal corresponds to an output power of the power source or transformer.

Figure 7:
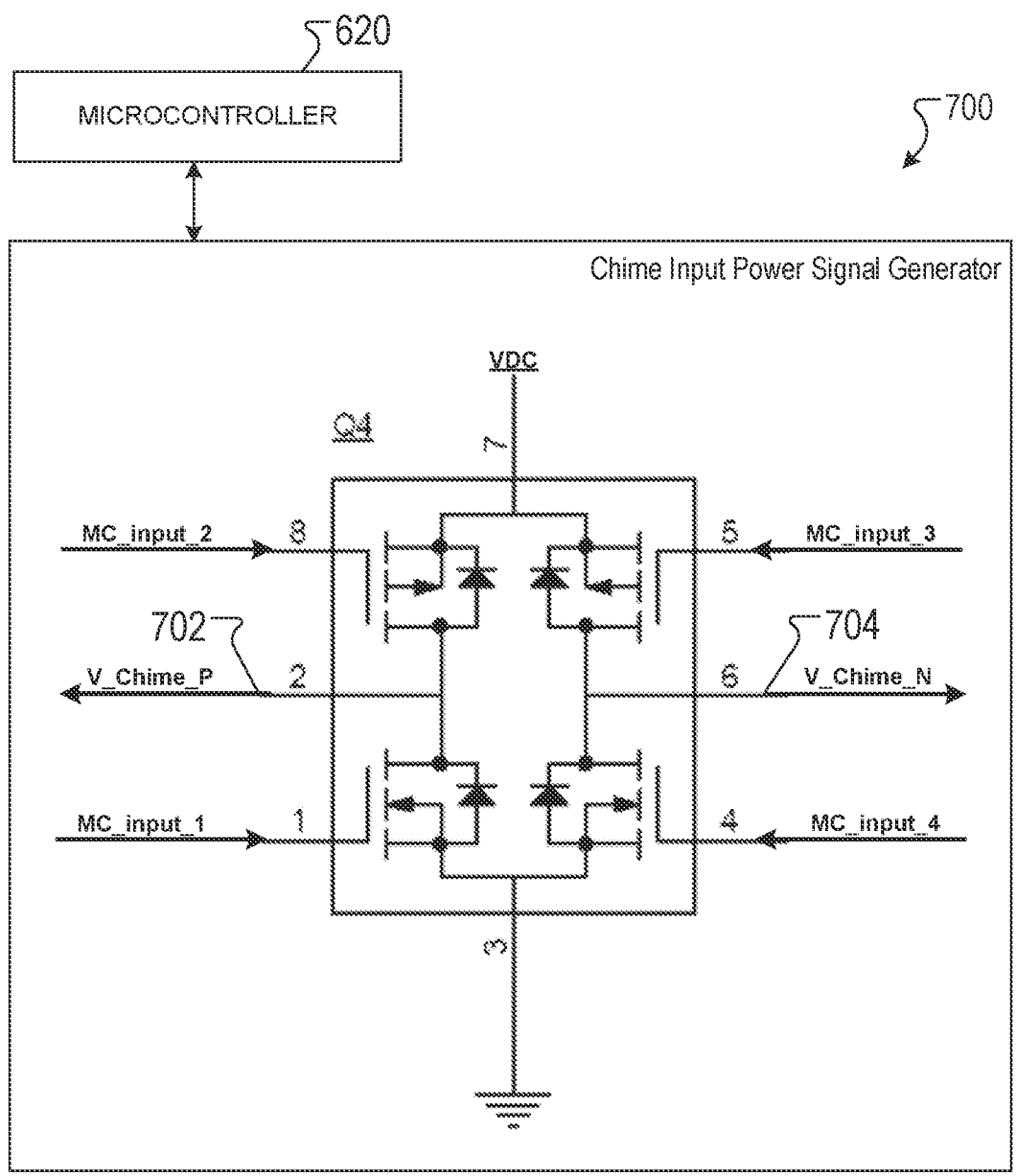
FIG. 7 illustrates an example power signal generator.

FIG. 7 illustrates an example power signal generator 700. In the example of FIG. 7, signal generator 700 is a chime input power signal generator that generates an AC waveform provided as an input to an electronic chime 108 to activate the chime. The power signal generator 700 generates its output power signal in response to the microcontroller determining that the ring pulse indicates an electronic chime. In some implementations, the power signal generator 700 is an HBridge circuit that includes a set of switching transistors. The switching transistors are arranged to generate an AC signal from a DC signal in reference to the two outputs that correspond to the transformer and front doorbell connection on any mechanical or electronic chime.

The microcontroller 620 turns on the power signal generator 700 based on one or more input control signals. The power signal generator 700 may be controlled by the microcontroller 620 to iteratively open and close each of the multiple transistor switches of the example H-bridge circuit. For example, after 770 milliseconds of providing a DC output, the microcontroller 620 determines that the chime is an electronic chime 108 and generates control signals that are provided to the power signal generator 700 along one or more pins of the microcontroller 620. Based on these control signals, the power signal generator 700 then generates an AC voltage signal to power the electronic chime 108.

In some implementations, power signal generator 700 includes a first set of switching transistors that cooperate to generate a positive half-period 702 of the AC voltage signal to power the electronic chime and a second set of switching transistors that cooperate to generate a negative half-period 704 of the AC voltage signal to power the electronic chime. The power signal generator 700 is configured to iteratively generate the positive half-period 702 and negative half-period 704 of the AC voltage signal for a finite duration using the first and second sets of switching transistors of the signal generation circuit. In some implementations, the power signal generator 700 generates a DC voltage signal following the finite duration.

Figure 8:
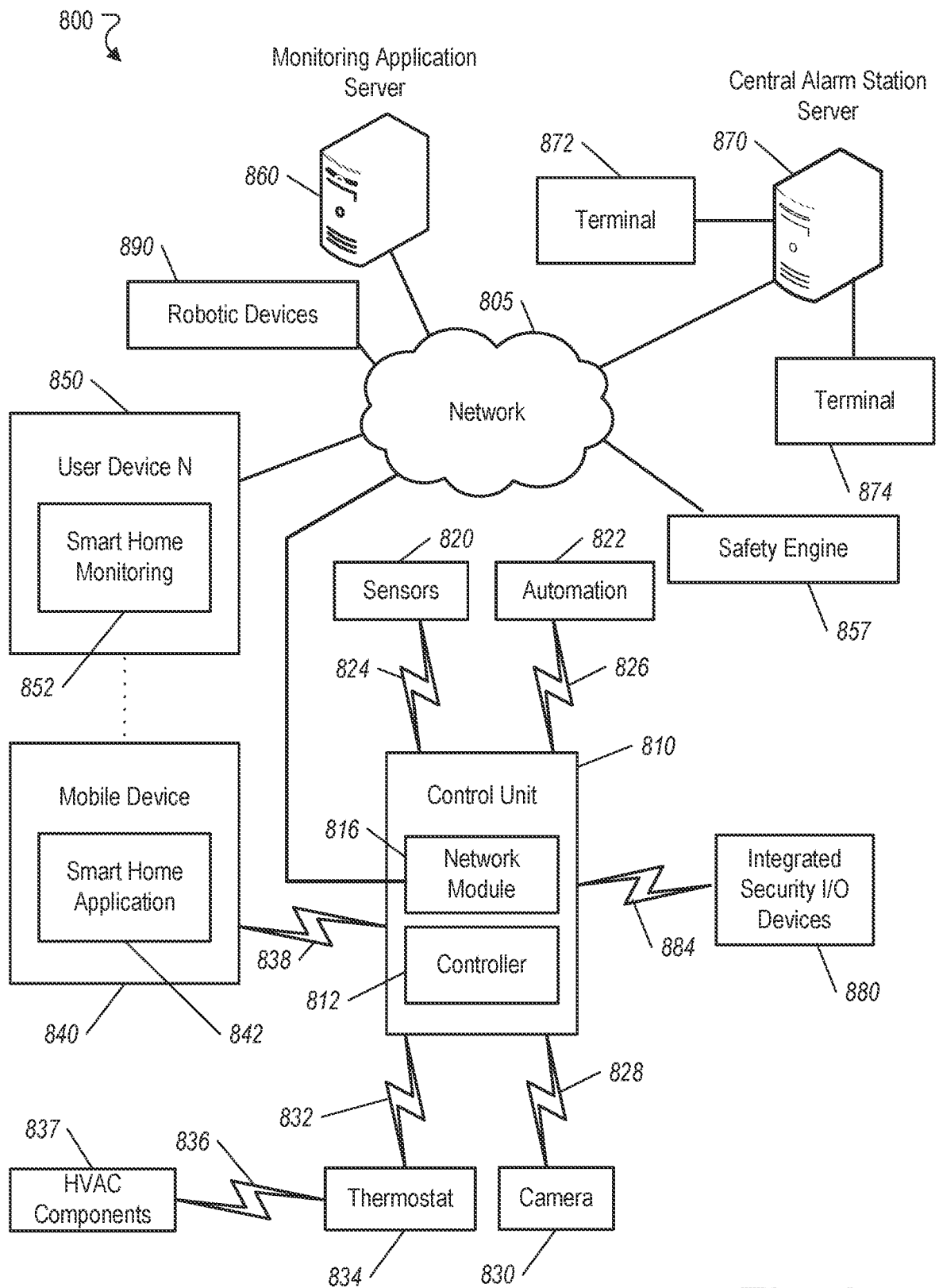
FIG. 8 is a block diagram illustrating an example security monitoring system.

FIG. 8 is a diagram illustrating an example of a home monitoring system 800. The monitoring system 800 includes a network 805, a control unit 810, one or more user devices 840 and 850, a monitoring server 860, and a central alarm station server 870. In some examples, the network 805 facilitates communications between the control unit 810, the one or more user devices 840 and 850, the monitoring server 860, and the central alarm station server 870.

The network 805 is configured to enable exchange of electronic communications between devices connected to the network 805. For example, the network 805 may be configured to enable exchange of electronic communications between the control unit 810, the one or more user devices 840 and 850, the monitoring server 860, and the central alarm station server 870. The network 805 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 805 may include multiple networks or subnetworks, each of which may include, for example, a wired or wireless data pathway. The network 805 may include a circuit-switched network, a packet-switched data network, or any other network able to carry electronic communications (e.g., data or voice communications). For example, the network 805 may include networks based on the Internet protocol (IP), asynchronous transfer mode (ATM), the PSTN, packet-switched networks based on IP, x.25, or Frame Relay, or other comparable technologies and may support voice using, for example, VoIP, or other comparable protocols used for voice communications. The network 805 may include one or more networks that include wireless data channels and wireless voice channels. The network 805 may be a wireless network, a broadband network, or a combination of networks including a wireless network and a broadband network.

The control unit 810 includes a controller 812 and a network module 816. The controller 812 is configured to control a control unit monitoring system (e.g., a control unit system) that includes the control unit 810. In some examples, the controller 812 may include a processor or other control circuitry configured to execute instructions of a program that controls operation of a control unit system. In these examples, the controller 812 may be configured to receive input from sensors, flow meters, or other devices included in the control unit system and control operations of devices included in the household (e.g., speakers, lights, doors, etc.). For example, the controller 812 may be configured to control operation of the network module 816 included in the control unit 810.

The network module 816 is a communication device configured to exchange communications over the network 805. The network module 816 may be a wireless communication module configured to exchange wireless communications over the network 805. For example, the network module 816 may be a wireless communication device configured to exchange communications over a wireless data channel and a wireless voice channel. In this example, the network module 816 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, 5G CDMA, EDGE or EGPRS, EV-DO or EVDO, UMTS, or IP.

The network module 816 also may be a wired communication module configured to exchange communications over the network 805 using a wired connection. For instance, the network module 816 may be a modem, a network interface card, or another type of network interface device. The network module 816 may be an Ethernet network card configured to enable the control unit 810 to communicate over a local area network and/or the Internet. The network module 816 also may be a voice band modem configured to enable the alarm panel to communicate over the telephone lines of Plain Old Telephone Systems (POTS).

The control unit system that includes the control unit 810 includes one or more sensors. For example, the monitoring system may include multiple sensors 820. The sensors 820 may include a lock sensor, a contact sensor, a motion sensor, or any other type of sensor included in a control unit system. The sensors 820 also may include an environmental sensor, such as a temperature sensor, a water sensor, a rain sensor, a wind sensor, a light sensor, a smoke detector, a carbon monoxide detector, an air quality sensor, etc. The sensors 820 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 820 can also include a radio-frequency identification (RFID) sensor that identifies a particular article that includes a pre-assigned RFID tag.

The control unit 810 communicates with the home automation controls 822 and a camera 830 to perform monitoring. The home automation controls 822 are connected to one or more devices that enable automation of actions in the home. For instance, the home automation controls 822 may be connected to one or more lighting systems and may be configured to control operation of the one or more lighting systems. In addition, the home automation controls 822 may be connected to one or more electronic locks at the home and may be configured to control operation of the one or more electronic locks (e.g., control Z-Wave locks using wireless communications in the Z-Wave protocol). Further, the home automation controls 822 may be connected to one or more appliances at the home and may be configured to control operation of the one or more appliances. The home automation controls 822 may include multiple modules that are each specific to the type of device being controlled in an automated manner. The home automation controls 822 may control the one or more devices based on commands received from the control unit 810. For instance, the home automation controls 822 may cause a lighting system to illuminate an area to provide a better image of the area when captured by a camera 830.

The camera 830 may be a video/photographic camera or other type of optical sensing device configured to capture images. For instance, the camera 830 may be configured to capture images of an area within a building or home monitored by the control unit 810. The camera 830 may be configured to capture single, static images of the area and also video images of the area in which multiple images of the area are captured at a relatively high frequency (e.g., thirty images per second). The camera 830 may be controlled based on commands received from the control unit 810.

The camera 830 may be triggered by several different types of techniques. For instance, a Passive Infra-Red (PIR) motion sensor may be built into the camera 830 and used to trigger the camera 830 to capture one or more images when motion is detected. The camera 830 also may include a microwave motion sensor built into the camera and used to trigger the camera 830 to capture one or more images when motion is detected. The camera 830 may have a "normally open" or "normally closed" digital input that can trigger capture of one or more images when external sensors (e.g., the sensors 820, PIR, door/window, etc.) detect motion or other events. In some implementations, the camera 830 receives a command to capture an image when external devices detect motion or another potential alarm event. The camera 830 may receive the command from the controller 812 or directly from one of the sensors 820.

In some examples, the camera 830 triggers integrated or external illuminators (e.g., Infra-Red, Z-wave controlled "white" lights, lights controlled by the home automation controls 822, etc.) to improve image quality when the scene is dark. An integrated or separate light sensor may be used to determine if illumination is desired and may result in increased image quality.

The camera 830 may be programmed with any combination of time/day schedules, system "arming state", or other variables to determine whether images should be captured or not when triggers occur. The camera 830 may enter a low-power mode when not capturing images. In this case, the camera 830 may wake periodically to check for inbound messages from the controller 812. The camera 830 may be powered by internal, replaceable batteries if located remotely from the control unit 810. The camera 830 may employ a small solar cell to recharge the battery when light is available. Alternatively, the camera 830 may be powered by the controller's 812 power supply if the camera 830 is co-located with the controller 812.

In some implementations, the camera 830 communicates directly with the monitoring server 860 over the Internet. In these implementations, image data captured by the camera 830 does not pass through the control unit 810 and the camera 830 receives commands related to operation from the monitoring server 860.

The system 800 may also include a thermostat 834 to perform dynamic environmental control at the home. The thermostat 834 is configured to monitor temperature and/or energy consumption of an HVAC system associated with the thermostat 834, and is further configured to provide control of environmental (e.g., temperature) settings. In some implementations, the thermostat 834 can additionally or alternatively receive data relating to activity at a home and/or environmental data at a home, e.g., at various locations indoors and outdoors at the home. The thermostat 834 can directly measure energy consumption of the HVAC system associated with the thermostat, or can estimate energy consumption of the HVAC system associated with the thermostat 834, for example, based on detected usage of one or more components of the HVAC system associated with the thermostat 834. The thermostat 834 can communicate temperature and/or energy monitoring information to or from the control unit 810 and can control the environmental (e.g., temperature) settings based on commands received from the control unit 810.

In some implementations, the thermostat 834 is a dynamically programmable thermostat and can be integrated with the control unit 810. For example, the dynamically programmable thermostat 834 can include the control unit 810, e.g., as an internal component to the dynamically programmable thermostat 834. In addition, the control unit 810 can be a gateway device that communicates with the dynamically programmable thermostat 834. In some implementations, the thermostat 834 is controlled via one or more home automation controls 822.

A module 837 is connected to one or more components of an HVAC system associated with a home, and is configured to control operation of the one or more components of the HVAC system. In some implementations, the module 837 is also configured to monitor energy consumption of the HVAC system components, for example, by directly measuring the energy consumption of the HVAC system components or by estimating the energy usage of the one or more HVAC system components based on detecting usage of components of the HVAC system. The module 837 can communicate energy monitoring information and the state of the HVAC system components to the thermostat 834 and can control the one or more components of the HVAC system based on commands received from the thermostat 834.

In some examples, the system 800 further includes one or more robotic devices 890. The robotic devices 890 may be any type of robots that are capable of moving and taking actions that assist in home monitoring. For example, the robotic devices 890 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and roll along the ground, walls, or ceiling) and land vehicle type devices (e.g., automated cars that drive around a home). In some cases, the robotic devices 890 may be devices that are intended for other purposes and merely associated with the system 800 for use in appropriate circumstances. For instance, a robotic vacuum cleaner device may be associated with the monitoring system 800 as one of the robotic devices 890 and may be controlled to take action responsive to monitoring system events.

In some examples, the robotic devices 890 automatically navigate within a home or outside a home. In these examples, the robotic devices 890 include sensors and control processors that guide movement of the robotic devices 890 within the home or outside the home. For instance, the robotic devices 890 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 890 may include control processors that process output from the various sensors and control the robotic devices 890 to move along a path that reaches the desired destination and avoids obstacles. In this regard, the control processors detect walls or other obstacles in the home or outside the home and guide movement of the robotic devices 890 in a manner that avoids the walls, trees, fences, and other obstacles.

In addition, the robotic devices 890 may store data that describes attributes of the home and the area outside the home. For instance, the robotic devices 890 may store a floorplan, a property map, and/or a three-dimensional model of the home that enables the robotic devices 890 to navigate the home. During initial configuration, the robotic devices 890 may receive the data describing attributes of the home, determine a frame of reference to the data (e.g., a home or reference location in the home), and navigate the home based on the frame of reference and the data describing attributes of the home. Further, initial configuration of the robotic devices 890 also may include learning of one or more navigation patterns in which a user provides input to control the robotic devices 890 to perform a specific navigation action (e.g., fly to an upstairs bedroom and spin around while capturing video and then return to a home charging base). In this regard, the robotic devices 890 may learn and store the navigation patterns such that the robotic devices 890 may automatically repeat the specific navigation actions upon a later request.

In some examples, the robotic devices 890 may include data capture and recording devices. In these examples, the robotic devices 890 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 890 to take and store a biometric sample that can be used to identify the person (e.g., a biometric sample with DNA that can be used for DNA testing).

In some implementations, the robotic devices 890 may include output devices. In these implementations, the robotic devices 890 may include one or more displays, one or more speakers, and/or any type of output devices that allow the robotic devices 890 to communicate information to a nearby user.

The robotic devices 890 also may include a communication module that enables the robotic devices 890 to communicate with the control unit 810, each other, and/or other devices. The communication module may be a wireless communication module that allows the robotic devices 890 to communicate wirelessly. For instance, the communication module may be a Wi-Fi module that enables the robotic devices 890 to communicate over a local wireless network at the home. The communication module further may be a 900 MHz wireless communication module that enables the robotic devices 890 to communicate directly with the control unit 810. Other types of short-range wireless communication protocols, such as Bluetooth, Bluetooth LE, Z-wave, Zigbee, etc., may be used to allow the robotic devices 890 to communicate with other devices in the home. In some implementations, the robotic devices 890 may communicate with each other or with other devices of the system 800 through the network 805.

The robotic devices 890 further may include processor and storage capabilities. The robotic devices 890 may include any suitable processing devices that enable the robotic devices 890 to operate applications and perform the actions described throughout this disclosure. In addition, the robotic devices 890 may include solid-state electronic storage that enables the robotic devices 890 to store applications, configuration data, collected sensor data, and/or any other type of information available to the robotic devices 890.

The robotic devices 890 are associated with one or more charging stations. The charging stations may be located at predefined home base or reference locations in the home. The robotic devices 890 may be configured to navigate to the charging stations after completion of tasks needed to be performed for the monitoring system 800. For instance, after completion of a monitoring operation or upon instruction by the control unit 810, the robotic devices 890 may be configured to automatically fly to and land on one of the charging stations. In this regard, the robotic devices 890 may automatically maintain a fully charged battery in a state in which the robotic devices 890 are ready for use by the monitoring system 800.

The charging stations may be contact based charging stations and/or wireless charging stations. For contact based charging stations, the robotic devices 890 may have readily accessible points of contact that the robotic devices 890 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 890 may charge through a wireless exchange of power. In these cases, the robotic devices 890 need only locate themselves closely enough to the wireless charging stations for the wireless exchange of power to occur. In this regard, the positioning needed to land at a predefined home base or reference location in the home may be less precise than with a contact based charging station. Based on the robotic devices 890 landing at a wireless charging station, the wireless charging station outputs a wireless signal that the robotic devices 890 receive and convert to a power signal that charges a battery maintained on the robotic devices 890.

In some implementations, each of the robotic devices 890 has a corresponding and assigned charging station such that the number of robotic devices 890 equals the number of charging stations. In these implementations, the robotic devices 890 always navigate to the specific charging station assigned to that robotic device. For instance, a first robotic device may always use a first charging station and a second robotic device may always use a second charging station.

In some examples, the robotic devices 890 may share charging stations. For instance, the robotic devices 890 may use one or more community charging stations that are capable of charging multiple robotic devices 890. The community charging station may be configured to charge multiple robotic devices 890 in parallel. The community charging station may be configured to charge multiple robotic devices 890 in serial such that the multiple robotic devices 890 take turns charging and, when fully charged, return to a predefined home base or reference location in the home that is not associated with a charger. The number of community charging stations may be less than the number of robotic devices 890.

In addition, the charging stations may not be assigned to specific robotic devices 890 and may be capable of charging any of the robotic devices 890. In this regard, the robotic devices 890 may use any suitable, unoccupied charging station when not in use. For instance, when one of the robotic devices 890 has completed an operation or is in need of battery charge, the control unit 810 references a stored table of the occupancy status of each charging station and instructs the robotic device to navigate to the nearest charging station that is unoccupied.

The system 800 further includes one or more integrated security devices 880. The one or more integrated security devices may include any type of device used to provide alerts based on received sensor data. For instance, the one or more control units 810 may provide one or more alerts to the one or more integrated security input/output devices 880. Additionally, the one or more control units 810 may receive one or more sensor data from the sensors 820 and determine whether to provide an alert to the one or more integrated security input/output devices 880.

The sensors 820, the home automation controls 822, the camera 830, the thermostat 834, and the integrated security devices 880 may communicate with the controller 812 over communication links 824, 826, 828, 832, 838, and 884. The communication links 824, 826, 828, 832, 838, and 884 may be a wired or wireless data pathway configured to transmit signals from the sensors 820, the home automation controls 822, the camera 830, the thermostat 834, and the integrated security devices 880 to the controller 812. The sensors 820, the home automation controls 822, the camera 830, the thermostat 834, and the integrated security devices 880 may continuously transmit sensed values to the controller 812, periodically transmit sensed values to the controller 812, or transmit sensed values to the controller 812 in response to a change in a sensed value.

The communication links 824, 826, 828, 832, 838, and 884 may include a local network. The sensors 820, the home automation controls 822, the camera 830, the thermostat 834, and the integrated security devices 880, and the controller 812 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 8 (CAT8) or Category 6 (CAT6) wired Ethernet network. The local network may be a mesh network constructed based on the devices connected to the mesh network.

The monitoring server 860 is an electronic device configured to provide monitoring services by exchanging electronic communications with the control unit 810, the one or more user devices 840 and 850, and the central alarm station server 870 over the network 805. For example, the monitoring server 860 may be configured to monitor events generated by the control unit 810. In this example, the monitoring server 860 may exchange electronic communications with the network module 816 included in the control unit 810 to receive information regarding events detected by the control unit 810. The monitoring server 860 also may receive information regarding events from the one or more user devices 840 and 850.

In some examples, the monitoring server 860 may route alert data received from the network module 816 or the one or more user devices 840 and 850 to the central alarm station server 870. For example, the monitoring server 860 may transmit the alert data to the central alarm station server 870 over the network 805.

The monitoring server 860 may store sensor and image data received from the monitoring system and perform analysis of sensor and image data received from the monitoring system. Based on the analysis, the monitoring server 860 may communicate with and control aspects of the control unit 810 or the one or more user devices 840 and 850.

The monitoring server 860 may provide various monitoring services to the system 800. For example, the monitoring server 860 may analyze the sensor, image, and other data to determine an activity pattern of a resident of the home monitored by the system 800. In some implementations, the monitoring server 860 may analyze the data for alarm conditions or may determine and perform actions at the home by issuing commands to one or more of the controls 822, possibly through the control unit 810.

The monitoring server 860 can be configured to provide information (e.g., activity patterns) related to one or more residents of the home monitored by the system 800 (e.g., an example user). For example, one or more of the sensors 820, the home automation controls 822, the camera 830, the thermostat 834, and the integrated security devices 880 can collect data related to a resident including location information (e.g., if the resident is home or is not home) and provide location information to the thermostat 834.

The central alarm station server 870 is an electronic device configured to provide alarm monitoring service by exchanging communications with the control unit 810, the one or more user devices 840 and 850, and the monitoring server 860 over the network 805. For example, the central alarm station server 870 may be configured to monitor alerting events generated by the control unit 810. In this example, the central alarm station server 870 may exchange communications with the network module 816 included in the control unit 810 to receive information regarding alerting events detected by the control unit 810. The central alarm station server 870 also may receive information regarding alerting events from the one or more user devices 840 and 850 and/or the monitoring server 860.

The central alarm station server 870 is connected to multiple terminals 872 and 874. The terminals 872 and 874 may be used by operators to process alerting events. For example, the central alarm station server 870 may route alerting data to the terminals 872 and 874 to enable an operator to process the alerting data. The terminals 872 and 874 may include general-purpose computers (e.g., desktop personal computers, workstations, or laptop computers) that are configured to receive alerting data from a server in the central alarm station server 870 and render a display of information based on the alerting data. For instance, the controller 812 may control the network module 816 to transmit, to the central alarm station server 870, alerting data indicating that a sensor 820 detected motion from a motion sensor via the sensors 820. The central alarm station server 870 may receive the alerting data and route the alerting data to the terminal 872 for processing by an operator associated with the terminal 872. The terminal 872 may render a display to the operator that includes information associated with the alerting event (e.g., the lock sensor data, the motion sensor data, the contact sensor data, etc.) and the operator may handle the alerting event based on the displayed information.

In some implementations, the terminals 872 and 874 may be mobile devices or devices designed for a specific function. Although FIG. 8 illustrates two terminals for brevity, actual implementations may include more (and, perhaps, many more) terminals.

The one or more authorized user devices 840 and 850 are devices that host and display user interfaces. For instance, the user device 840 is a mobile device that hosts or runs one or more native applications (e.g., the home monitoring application 842). The user device 840 may be a cellular phone or a non-cellular locally networked device with a display. The user device 840 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 840 may perform functions unrelated to the monitoring system, such as placing personal telephone calls, playing music, playing video, displaying pictures, browsing the Internet, maintaining an electronic calendar, etc.

The user device 840 includes a home monitoring application 852. The home monitoring application 842 refers to a software/firmware program running on the corresponding mobile device that enables the user interface and features described throughout. The user device 840 may load or install the home monitoring application 842 based on data received over a network or data received from local media. The home monitoring application 842 runs on mobile devices platforms, such as iPhone, iPod touch, Blackberry, Google Android, Windows Mobile, etc. The home monitoring application 842 enables the user device 840 to receive and process image and sensor data from the monitoring system.

The user device 840 may be a general-purpose computer (e.g., a desktop personal computer, a workstation, or a laptop computer) that is configured to communicate with the monitoring server 860 and/or the control unit 810 over the network 805. The user device 840 may be configured to display a smart home user interface 852 that is generated by the user device 840 or generated by the monitoring server 860. For example, the user device 840 may be configured to display a user interface (e.g., a web page) provided by the monitoring server 860 that enables a user to perceive images captured by the camera 830 and/or reports related to the monitoring system. Although FIG. 8 illustrates two user devices for brevity, actual implementations may include more (and, perhaps, many more) or fewer user devices.

In some implementations, the one or more user devices 840 and 850 communicate with and receive monitoring system data from the control unit 810 using the communication link 838. For instance, the one or more user devices 840 and 850 may communicate with the control unit 810 using various local wireless protocols such as Wi-Fi, Bluetooth, Z-wave, Zigbee, MoCA, HomePlug (ethernet over power line), or wired protocols such as Ethernet and USB, to connect the one or more user devices 840 and 850 to local security and automation equipment. The one or more user devices 840 and 850 may connect locally to the monitoring system and its sensors and other devices. The local connection may improve the speed of status and control communications because communicating through the network 805 with a remote server (e.g., the monitoring server 860) may be significantly slower.

Although the one or more user devices 840 and 850 are shown as communicating with the control unit 810, the one or more user devices 840 and 850 may communicate directly with the sensors and other devices controlled by the control unit 810. In some implementations, the one or more user devices 840 and 850 replace the control unit 810 and perform the functions of the control unit 810 for local monitoring and long range/offsite communication.

In other implementations, the one or more user devices 840 and 850 receive monitoring system data captured by the control unit 810 through the network 805. The one or more user devices 840, 850 may receive the data from the control unit 810 through the network 805 or the monitoring server 860 may relay data received from the control unit 810 to the one or more user devices 840 and 850 through the network 805. In this regard, the monitoring server 860 may facilitate communication between the one or more user devices 840 and 850 and the monitoring system.

In some implementations, the one or more user devices 840 and 850 may be configured to switch whether the one or more user devices 840 and 850 communicate with the control unit 810 directly (e.g., through link 838) or through the monitoring server 860 (e.g., through network 805) based on a location of the one or more user devices 840 and 850. For instance, when the one or more user devices 840 and 850 are located close to the control unit 810 and in range to communicate directly with the control unit 810, the one or more user devices 840 and 850 use direct communication. When the one or more user devices 840 and 850 are located far from the control unit 810 and not in range to communicate directly with the control unit 810, the one or more user devices 840 and 850 use communication through the monitoring server 860.

Although the one or more user devices 840 and 850 are shown as being connected to the network 805, in some implementations, the one or more user devices 840 and 850 are not connected to the network 805. In these implementations, the one or more user devices 840 and 850 communicate directly with one or more of the monitoring system components and no network (e.g., Internet) connection or reliance on remote servers is needed.

In some implementations, the one or more user devices 840 and 850 are used in conjunction with only local sensors and/or local devices in a house. In these implementations, the system 800 includes the one or more user devices 840 and 850, the sensors 820, the home automation controls 822, the camera 830, and the robotic devices 890. The one or more user devices 840 and 850 receive data directly from the sensors 820, the home automation controls 822, the camera 830, and the robotic devices 890, and sends data directly to the sensors 820, the home automation controls 822, the camera 830, and the robotic devices 890. The one or more user devices 840, 850 provide the appropriate interfaces/processing to provide visual surveillance and reporting.

In other implementations, the system 800 further includes network 805 and the sensors 820, the home automation controls 822, the camera 830, the thermostat 834, and the robotic devices 890, and are configured to communicate sensor and image data to the one or more user devices 840 and 850 over network 805 (e.g., the Internet, cellular network, etc.). In yet another implementation, the sensors 820, the home automation controls 822, the camera 830, the thermostat 834, and the robotic devices 890 (or a component, such as a bridge/router) are intelligent enough to change the communication pathway from a direct local pathway when the one or more user devices 840 and 850 are in close physical proximity to the sensors 820, the home automation controls 822, the camera 830, the thermostat 834, and the robotic devices 890 to a pathway over network 805 when the one or more user devices 840 and 850 are farther from the sensors 820, the home automation controls 822, the camera 830, the thermostat 834, and the robotic devices 890.

In some examples, the system leverages GPS information from the one or more user devices 840 and 850 to determine whether the one or more user devices 840 and 850 are close enough to the sensors 820, the home automation controls 822, the camera 830, the thermostat 834, and the robotic devices 890 to use the direct local pathway or whether the one or more user devices 840 and 850 are far enough from the sensors 820, the home automation controls 822, the camera 830, the thermostat 834, and the robotic devices 890 that the pathway over network 805 is required.

In other examples, the system leverages status communications (e.g., pinging) between the one or more user devices 840 and 850 and the sensors 820, the home automation controls 822, the camera 830, the thermostat 834, and the robotic devices 890 to determine whether communication using the direct local pathway is possible. If communication using the direct local pathway is possible, the one or more user devices 840 and 850 communicate with the sensors 820, the home automation controls 822, the camera 830, the thermostat 834, and the robotic devices 890 using the direct local pathway. If communication using the direct local pathway is not possible, the one or more user devices 840 and 850 communicate with the sensors 820, the home automation controls 822, the camera 830, the thermostat 834, and the robotic devices 890 using the pathway over network 805.

In some implementations, the system 800 provides end users with access to images captured by the camera 830 to aid in decision making. The system 800 may transmit the images captured by the camera 830 over a wireless WAN network to the user devices 840 and 850. Because transmission over a wireless WAN network may be relatively expensive, the system 800 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 830). In these implementations, the camera 830 may be set to capture images on a periodic basis when the alarm system is armed in an "away" state, but set not to capture images when the alarm system is armed in a "home" state or disarmed. In addition, the camera 830 may be triggered to begin capturing images when the alarm system detects an event, such as an alarm event, a door-opening event for a door that leads to an area within a field of view of the camera 830, or motion in the area within the field of view of the camera 830. In other implementations, the camera 830 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A smart dehum circuit for powering a chime that outputs audio in response to detection of a trigger event by a video doorbell, the circuit comprising:
   a detector circuit configured to generate a power signal in response to determining that an output voltage signal of a first circuit exceeds a threshold voltage; and
   a microcontroller coupled to the detector circuit, the microcontroller being configured to:
      generate a chime power signal based on the power signal of the detector circuit wherein the chime power signal is generated to power the chime in response to detection of the trigger event by the video doorbell; and
      determine, based on a timing logic of the microcontroller, that the chime is an electronic chime in response to determining that the chime power signal satisfies a first time threshold.

2. The smart dehum circuit of claim 1, wherein the microcontroller comprises the timing logic and is further configured to:
   determine, based on the timing logic of the microcontroller, that the power signal of the detector circuit satisfies a second time threshold; and
   generate the chime power signal based on the determination that the power signal satisfies the second time threshold.

3. The smart dehum circuit of claim 2, wherein:
   the second time threshold is a filter feature of the circuit that precludes inadvertent powering of the chime from signal spikes that occur based on a power demand of the video doorbell.

4. The smart dehum circuit of claim 2, wherein:
   the microcontroller generates the chime power signal only after determining that the power signal of the detector circuit satisfies the second time threshold so as to prevent inadvertent powering of the chime.

5. The smart dehum circuit of claim 1, wherein the chime is an electronic chime or a mechanical chime.

6. The smart dehum circuit of claim 1, comprising a signal generation circuit configured to:
   generate, based on the chime power signal, an Alternating-Current (AC) voltage signal to power the electronic chime.

7. The smart dehum circuit of claim 6, wherein the signal generation circuit comprises:
   a first set of switching transistors that cooperate to generate a positive half-period of the AC voltage signal to power the electronic chime; and
   a second set of switching transistors that cooperate to generate a negative half-period of the AC voltage signal to power the electronic chime.

8. The smart dehum circuit of claim 7, wherein the signal generation circuit is configured to:
   iteratively generate the positive half-period and negative half-period of the AC voltage signal for a finite duration using the first and second sets of switching transistors of the signal generation circuit; and
   generate a DC voltage signal following the finite duration.

9. The smart dehum circuit of claim 1, wherein:
   the detector circuit comprises a rectifier that generates an output signal based on an AC input signal that is generated by a power source.

10. The smart dehum circuit of claim 9, wherein:
    the detector circuit is a second detector circuit comprising a transistor switch that is coupled to the rectifier and configured to generate the power signal during an operating mode where the chime outputs the audio based on detection of the trigger event by the video doorbell.

11. The smart dehum circuit of claim 1, wherein the trigger event is detection of an entity by the video doorbell.

12. A method implemented using a smart dehum circuit for powering a chime that outputs audio in response to detection of a trigger event by a video doorbell, the method comprising:
    generating, by a first circuit, an output signal based on a power source;
    determining that the output signal of the first circuit exceeds a threshold voltage;
    generating, by a second circuit coupled to the first circuit, a power signal in response to determining that the output signal exceeds a threshold voltage;
    generating, using a microcontroller coupled to the second circuit, a chime power signal based on the power signal of the second circuit wherein the chime power signal is generated to power the chime in response to detection of the trigger event by the video doorbell; and determining, by the microcontroller and based on a timing logic, that the chime is an electronic chime in response to determining that the chime power signal satisfies a first time threshold.

13. The method of claim 12, wherein the microcontroller comprises the timing logic and the method comprises:

determining, based on the timing logic of the microcontroller, that the power signal satisfies a second time threshold; and generating the chime power signal based on the determination that the power signal satisfies the first second time threshold.

14. The method of claim 13, wherein generating the chime power signal based on the power signal comprises:

generating the chime power signal only after determining that the power signal of the satisfies the second time threshold so as to prevent inadvertent powering of the chime.

15. The method of claim 12, wherein the chime is an electronic chime or a mechanical chime.

16. The method of claim 12, wherein the smart dehum circuit comprises a signal generation circuit and the method comprises:

generating, using the signal generation circuit, an Alternating-Current (AC) voltage signal based on the chime power signal to power the electronic chime.

17. The method of claim 16, wherein the signal generation circuit comprises a first set of switching transistors and a second set of switching transistors and the method comprises:

generating, based on the first set of switching transistors, a positive half-period of the AC voltage signal to power the electronic chime; and generating, based on the second set of switching transistors, a negative half-period of the AC voltage signal to power the electronic chime.

18. A system comprising:

a processing device; and a non-transitory machine-readable storage medium storing instructions that are executable by the processing device to cause performance of operations comprising:

generating, by a first circuit, an output signal based on a power source;

determining that the output signal of the first circuit exceeds a threshold voltage;

generating, by a second circuit coupled to the first circuit, a power signal in response to determining that the output signal exceeds a threshold voltage;

generating, using a microcontroller coupled to the second circuit, a chime power signal based on the power signal of the second circuit, wherein the chime power signal is generated to power a chime in response to detection of a trigger event by a video doorbell; and determining, by the microcontroller and based on a timing logic, that the chime is an electronic chime in response to determining that the chime power signal satisfies a time threshold.

\* \* \* \* \*

UNITED STATES PATENT AND TRADEMARK OFFICE
CERTIFICATE OF CORRECTION

PATENT NO. : 11,743,392 B2  
APPLICATION NO. : 17/209112  
DATED : August 29, 2023  
INVENTOR(S) : Seton Paul Kasmir Page 1 of 1

It is certified that error appears in the above-identified patent and that said Letters Patent is hereby corrected as shown below:

On the Title Page

Column 2 (Primary Examiner), Line 1, delete "Runnings" and insert -- Hunnings --.

In the Claims

In Claim 1, Column 23, Line 60, delete "circuit" and insert -- circuit, --.

In Claim 12, Column 25, Line 1, delete "circuit" and insert -- circuit, --.

In Claim 13, Column 25, Line 13, after "satisfies the" delete "first".

In Claim 14, Column 25, Line 18, after "signal" delete "of the".

Signed and Sealed this  
Twenty-first Day of November, 2023

Katherine Kelly Vidal  
*Director of the United States Patent and Trademark Office*